(12) United States Patent
Hockin et al.

(10) Patent No.: US 12,056,653 B1
(45) Date of Patent: Aug. 6, 2024

(54) DEVICES AND METHODS FOR TRIP DETECTION IN AN ASSET TRACKER

(71) Applicant: Geotab Inc., Oakville (CA)

(72) Inventors: Robert Spencer Hockin, Milton (CA); Farzan Farhangian, Toronto (CA); Yongkyun Shin, Oakville (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 18/588,162

(22) Filed: Feb. 27, 2024

Related U.S. Application Data

(60) Provisional application No. 63/603,827, filed on Nov. 29, 2023.

(51) Int. Cl.
*G06Q 10/0833* (2023.01)
*G01P 13/00* (2006.01)
*G01P 15/00* (2006.01)

(52) U.S. Cl.
CPC .......... *G06Q 10/0833* (2013.01); *G01P 13/00* (2013.01); *G01P 15/001* (2013.01)

(58) Field of Classification Search
CPC .... G06Q 10/0833; G01P 13/00; G01P 15/001
See application file for complete search history.

(56) References Cited

U.S. PATENT DOCUMENTS

2021/0325547 A1\* 10/2021 Howell ................... G01S 5/017
2022/0147922 A1\* 5/2022 Cawse .................... H04W 4/38

\* cited by examiner

*Primary Examiner* — Manuel A Rivera Vargas
(74) *Attorney, Agent, or Firm* — Sherif A. Abdel-Kader

(57) ABSTRACT

Devices and methods for detecting an end of trip by an asset tracker are described. An end of trip may be detected using a Global Navigation Satellite System (GNSS) module or an Inertial Measurement Unit (IMU), such as a three-axis accelerometer. In some implementations, the asset tracker uses the IMU for end of trip detection. In other implementations, the asset tracker uses the IMU for impact detection while using the GNSS module for end of trip detection.

7 Claims, 11 Drawing Sheets

DEVICES AND METHODS FOR TRIP DETECTION IN AN ASSET TRACKER

FIELD

The present disclosure generally relates to asset tracking, and more specifically to devices and methods for trip detection in an asset tracker.

BACKGROUND

An asset tracker is an electronic device deployed in an asset for tracking the location and condition thereof. An asset tracker is typically part of an asset tracking system. An asset tracking system enables tracking the location and condition of one or more assets. An asset may be a vehicle, a piece of equipment, a shipping container, a trailer, a tank, or any other type of asset whose location and condition is to be tracked. An asset tracker is coupled to the asset and deployed in the field. A battery-powered asset tracker has limited electric energy for operation.

SUMMARY

In one aspect of the present disclosure, there is provided a method for trip detection by an asset tracker, the method comprising operating the asset tracker in a shipping state, in response to an activation successful event transitioning the asset tracker to a travel motion detection state, and in response to detecting travel motion, transitioning the asset tracker to a traveling state.

In the method, operating the asset tracker in the shipping state may comprise entering a sleep mode, configuring an inertial measurement unit to detect an activation trigger activity, and in response to detecting the activation trigger activity: obtaining a first location of the asset tracker, and generating the activation successful event.

In the method, the activation trigger activity may comprise at least one mid-air gesture.

In the method, detecting travel motion may comprise measuring by a 3-axis accelerometer an acceleration that is greater than a travel motion acceleration threshold for a duration exceeding a travel motion detection duration threshold.

The method may further comprise, in the traveling state: obtaining a second location of the asset tracker, and when a distance between the second location and the first location is greater than a travel distance threshold: when a trip has not already started: configuring a 3-axis accelerometer for impact detection, and reporting a start of trip event.

The method may further comprise, in the traveling state: obtaining a second location of the asset tracker, and when a distance between the second location and the first location is greater than a travel distance threshold: when a trip has already started: transitioning to an end of trip state, reporting an end of trip event, and transitioning to the travel motion detection state subsequent to reporting the end of trip.

The method may further comprise, in the traveling state: obtaining a second location of the asset tracker, and when a distance between the second location and the first location is smaller than a travel distance threshold: when a trip has not already started: transitioning back to the travel motion detection state.

The method may further comprise, in the traveling state: in response to detecting an impact by the 3-axis accelerometer: transitioning to an impact state.

The method may further comprise, in the traveling state: obtaining a second location of the asset tracker, and when a distance between the second location and the first location is greater than a travel distance threshold: when a trip has not already started: configuring a 3-axis accelerometer for end of trip detection, and reporting a start of trip event.

In the method, configuring the 3-axis accelerometer for end of trip detection may comprise configuring the 3-axis accelerometer to generate an event if a detected acceleration drops by an end of trip drop threshold for a and end of trip detection duration.

The method may further comprise, in the traveling state: obtaining a second location of the asset tracker, and when a distance between the second location and the first location is greater than a travel distance threshold: when a trip has not already started: configuring a 3-axis accelerometer for impact detection, configuring the 3-axis accelerometer for end of trip detection, and reporting a start of trip event.

In another aspect of the present disclosure, there is provided an asset tracker, comprising: a housing, a controller disposed in the housing, a location module disposed in the housing and coupled to the controller, an inertial measurement unit disposed in the housing and coupled to the controller, and a memory coupled to the controller. The memory stores machine-executable programming instructions which, when executed by the controller, configure the asset tracker to: operate the asset tracker in a shipping state, in response to an activation successful event, transition the asset tracker to a travel motion detection state, in response to detecting travel motion, transition the asset tracker to a traveling state, and in response to detecting an end of trip event, transition the asset tracker to an end of trip state.

In the asset tracker, the machine-executable programming instructions which configure the asset tracker to operate in the shipping state may comprise machine-executable programming instructions which configure the asset tracker to: enter a sleep mode, configure the inertial measurement unit to detect an activation trigger activity, and in response to detecting the activation trigger activity: obtain a first location of the asset tracker, and generate the activation successful event.

In the asset tracker, the inertial measurement unit may comprise a 3-axis accelerometer.

In the asset tracker, the machine-executable programming instructions which configure the asset tracker to detect travel motion may comprise machine-executable programming instructions which configure the asset tracker to measure by the 3-axis accelerometer an acceleration that is greater than a travel motion acceleration threshold for a duration exceeding a travel motion detection duration threshold.

In the asset tracker, the machine-executable programming instructions may further configure the asset tracker to, in the traveling state: obtain a second location of the asset tracker, and when a distance between the second location and the first location is greater than a travel distance threshold: when a trip has not already started: configure the 3-axis accelerometer for impact detection, and report a start of trip event.

In the asset tracker, the machine-executable programming instructions may further configure the asset tracker to, in the traveling state: obtain a second location of the asset tracker; and when a distance between the second location and the first location is greater than a travel distance threshold: when a trip has already started: transition to an end of trip state, report the end of trip, and transition to the travel motion detection state subsequent to reporting the end of trip.

In the asset tracker, the machine-executable programming instructions may further configure the asset tracker to, in the traveling state: in response to detecting an impact by the 3-axis accelerometer, transition to an impact state.

In the asset tracker, the machine-executable programming instructions may further configure the asset tracker to, in the traveling state: obtain a second location of the asset tracker, and when a distance between the second location and the first location is greater than a travel distance threshold: when a trip has not already started: configure the 3-axis accelerometer for end of trip detection, and report a start of trip event.

In the asset tracker, the machine-executable programming instructions may further configure the asset tracker to, in the traveling state: when a trip has not already started: configure the 3-axis accelerometer for end of trip detection, configure the 3-axis accelerometer for end of trip detection, and report a start of trip event.

BRIEF DESCRIPTION OF THE DRAWINGS

Exemplary non-limiting embodiments of the present disclosure are described with reference to the accompanying drawings in which.

DETAILED DESCRIPTION

Figure 1:
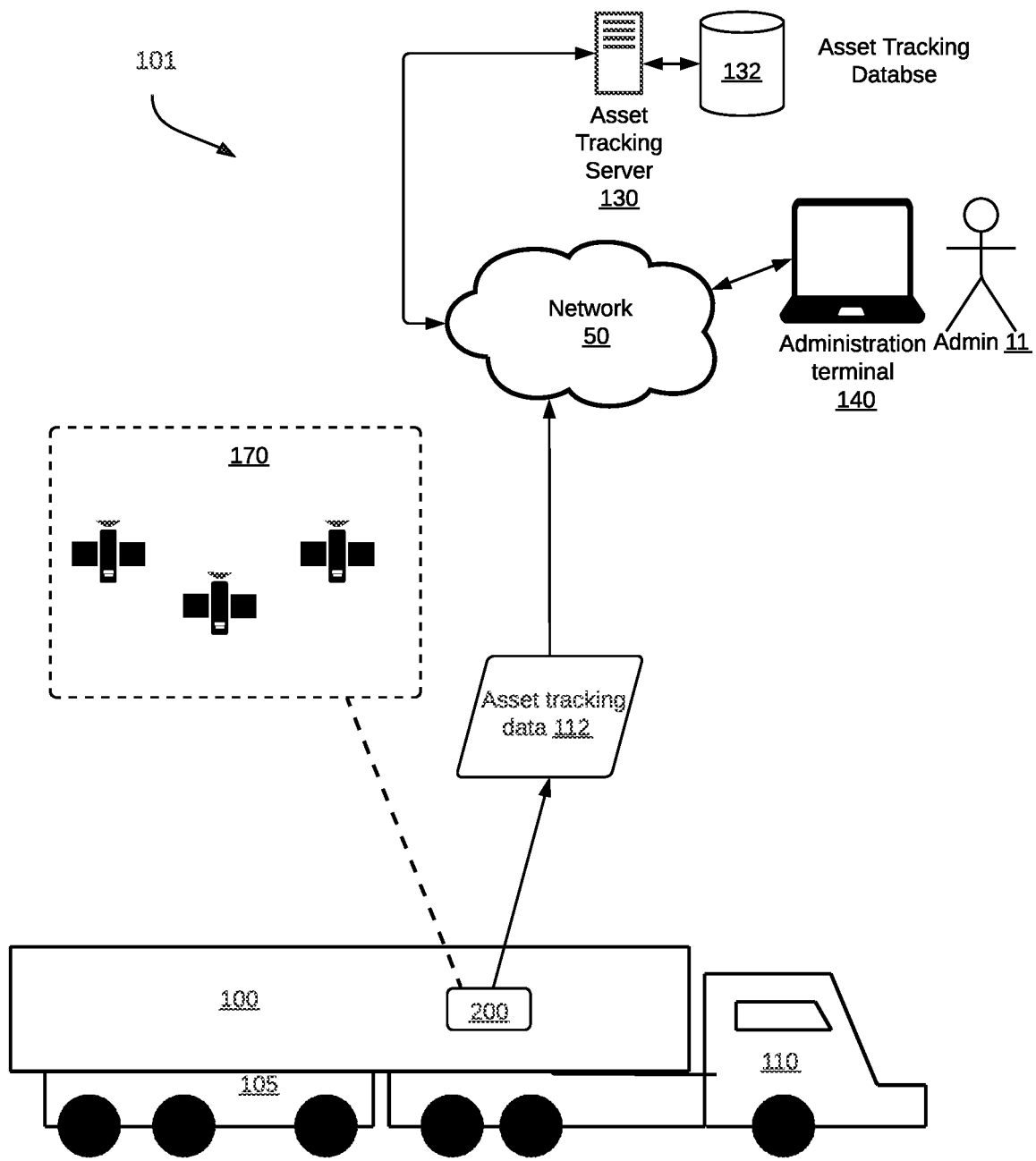
FIG. 1 is a schematic diagram of an asset tracking system including an asset tracker coupled to an engineless asset.

The present disclosure relates generally to asset tracking, and specifically to a device and a method for activating an asset tracker. More specifically, the present disclosure provides devices and methods for activating an asset tracker and enabling a motion detection mode thereon in response to an activation trigger activity.

An asset tracker is an electronic device deployed in an asset for tracking the location and condition thereof. An asset tracker is typically part of an asset tracking system. An asset tracking system allows an administrator to track the location and condition of one or more than one assets. An asset may be a vehicle, a piece of equipment, a shipping container, a trailer, a tank, or any other type of asset whose location and condition need to be tracked.

Asset trackers are typically powered by a battery. Some asset trackers are powered by a rechargeable battery coupled to an energy harvester, such as a solar panel. Other asset trackers are powered by a non-rechargeable battery. A non-rechargeable battery is a type of battery that cannot be recharged after it is depleted. Some common types of non-rechargeable batteries used in portable electronic devices, such as asset trackers, include zinc-carbon batteries and alkaline batteries. In this disclosure, a "battery-powered asset tracker" refers to an asset tracker powered by a non-rechargeable and non-replaceable battery. Once a battery-powered asset tracker is deployed in the field, the asset tracker works off of the non-rechargeable battery until the non-rechargeable battery is depleted. Some asset trackers have to be certified for ingress protection and therefore it is preferable that such asset trackers have a sealed housing and that the battery is not replaceable. Furthermore, a non-replaceable battery avoids the need for building a battery compartment, battery contacts, and the like thus reducing the cost.

Asset Tracking System

An asset tracking system facilitates tracking and monitoring the location, movement, and condition of various assets. An asset tracking system may be used in logistics, transportation, supply chain management, and other industries. Asset trackers are electronic devices that are coupled with assets to track and monitor the location, movement, and condition of the assets. An asset may be a vehicle, a valuable piece of equipment, a shipping container, a trailer, a tank, or any other type of asset whose location, movement, and condition need to be tracked. The asset tracker is an electronic device that contains at least one of a location module, an inertial measurement unit, and one or more sensors. The location module determines the location of the asset tracker, and hence the location of the asset. The inertial measurement unit (IMU) detects motion, orientation, and heading. The one or more sensors determine the conditions experienced by the asset tracker, such as temperature, pressure, noise, and the like. The asset tracker periodically communicates the location, movement, and/or conditions thereof to a remote server, such as an asset tracking server. Accordingly, the location, movement, and/or condition of the asset may be tracked in real-time or near real-time. The asset tracker captures the location thereof in real-time, but reports the location and/or other conditions to the remote server periodically in order to save power consumption. The asset tracker is also capable of identifying and recording a trip including the start time and the end time of the trip.

FIG. 1 shows a high-level block diagram of an asset tracking system 101. The asset tracking system 101 includes an asset tracker 200 deployed in an asset 100, a network 50, an asset tracking server 130, an administration terminal 140, and satellites 170. While a single instance of each element is shown for simplicity, multiple instances of each shown element are typical in an asset tracking system.

The asset 100 shown is in the form of a shipping container placed on a trailer 105 coupled to a tractor 110. The asset 100 may be a shipping container, a vehicle, industrial equipment, construction equipment, a tank holding a chemical, or any other asset whose location, movement, and/or condition needs to be tracked. The asset 100 may be transported by a trailer 105 as shown, or may be transported by a ship, a train, an airplane, or any other means of transportation. The asset 100 may also be a piece of industrial or construction equipment, such as a generator, a concrete mixer, a compressor, and the like. Such types of assets may have wheels and may be towed from one site to another.

The asset tracker 200 is an electronic device coupled to an asset, such as the asset 100. The asset tracker 200 is configured to track the location, movement, and/or condition of the asset 100.

In some implementations, the asset tracker 200 is powered by a battery. In other implementations, the asset tracker 200 is powered by a rechargeable battery and contains an energy harvester such as a solar panel for recharging the rechargeable battery. In the latter case, the asset tracker 200 is an example of an electronic device powered by a rechargeable battery and an energy harvester. The asset tracker 200 utilizes a Global Navigation Satellite System (GNSS) to obtain the location thereof. In the depicted embodiment, the asset tracker 200 is in communication with the satellites 170 to obtain the location thereof. The asset tracker 200 also contains an inertial measurement unit (IMU) and/or sensors such as temperature, light, and pressure sensors. The combination of location data, movement, and sensor data are termed asset tracking data 112. The asset tracker 200 connects to a network 50 which allows the asset tracker 200 to send the asset tracking data 112 to a remote server such as the asset tracking server 130.

The network 50 may be a single network or a combination of networks such as a data cellular network, a wide area network, the Internet, and other network technologies. The network 50 provides connectivity between the asset tracker 200 and the asset tracking server 130, and between the administration terminal 140 and the asset tracking server 130.

In some implementations of the asset tracking system 101, the network 50 is a cellular network utilizing cellular technology. In one implementation, the network 50 uses the second-generation (2G) cellular technology which is based on the Global System for Mobiles (GSM) protocol and supports data transmission protocols such as the General Packet Radio Service (GPRS) or the Enhanced Data rates for GSM Evolution (EDGE). In another implementation, the network 50 uses the Third-generation (3G) cellular technology utilizing the Universal Mobile Telephone System (UMTS) supporting data transfer using the High Speed Packet Access (HSPA) protocol. In yet another implementation, the network 50 uses the Fourth-generation cellular technology (4G) which uses the Long Term Evolution (LTE) protocol. In another implementation, the network 50 uses the Fifth-generation (5G) cellular technology. In yet another implementation, the network 50 uses the Narrowband Internet of Things (NB-IoT) which is a low-power wide-area network (LPWAN) technology that is part of the Third Generation Partnership Project (3GPP) standard.

In some implementations of the asset tracking system 101, the network 50 comprises a Wide Area Network (WAN) using non-cellular WAN technologies. One example of a non-cellular WAN technology that the network 50 can use is the Worldwide Interoperability For Microwave Access (WiMAX™) which is based on the IEEE 802.16 family of standards. Another example of a non-cellular WAN technology that the network 50 may use is Long Range Wide Area Network (LoRaWAN™) technology which is a low-power WAN protocol. Yet another example of a non-cellular WAN technology that the network 50 may use is Weightless which is a family of open standard low-power WAN (LPWAN) technology that operate in the sub-GHz frequency bands.

In some implementations of the asset tracking system 101, the network 50 uses a wired network technology when the asset tracker 200 is coupled to an asset that provides wired network connectivity. Examples of wired network technologies include Ethernet, Fast Ethernet, Local Talk™, Token Ring, Fiber Distributed Data Interface (FDDI), and Asynchronous Transfer Mode (ATM).

In some implementations, the network 50 is a combination of the above-specified technologies.

The asset tracking server 130 is an electronic device capable of executing machine-executable programming instructions for receiving, storing, and analyzing the asset tracking data 112. The asset tracking server 130 may be implemented as a single computer system or a cluster of computers. The asset tracking server 130 may utilize an operating system such as Linux, Windows, Unix, FreeBSD, macOS Server, VMware ESXI, Microsoft Hyper-V Server, Oracle Solaris, IBM AIX, or any other equivalent operating system. Alternatively, the asset tracking server 130 may be implemented on a cloud computing platform, such as Amazon Web Service (AWS), Microsoft Azure, Google Cloud Platform (GCP), IBM Cloud, Oracle Cloud, and Alibaba Cloud. The asset tracking server 130 is connected to the network 50 and may receive asset tracking data 112 from the asset tracker 200. The asset tracking server 130 may have a plurality of software modules for performing data analysis and analytics on the telematics data to obtain useful asset information about the assets 100. The asset tracking server 130 may be coupled to an asset tracking database 132 for storing telematics data and/or the results of the analytics which are related to the asset 100. The asset tracking server 130 may communicate the asset tracking data 112 pertaining to the asset 100 to the administration terminal 140.

The satellites 170 may be part of a global navigation satellite system (GNSS) which is a satellite-based navigation system that provides positioning, navigation, and timing services worldwide. The four primary GNSS systems in operation today are Global Positioning System (GPS), Global Navigation Satellite System (GLONASS), Galileo, and BeiDou. GPS was developed and operated by the United States, GLONASS is the Russian counterpart of GPS, Galileo is the European Union's GNSS, and BeiDou is the Chinese GNSS system. Other less commonly used GNSS systems are QZSS (Japan) and IRNSS or NavIC (India). The location information may be processed by a location module on the asset tracker 200 to provide location data indicating the location of the asset tracker 200 (and hence the location of the asset 100 coupled thereto). In other implementations (not shown), the asset tracker 200 may use other means to determine the location thereof as outlined below.

The administration terminal 140 is an electronic device capable of connecting to the asset tracking server 130, over the network 50. The administration terminal can be configured to retrieve data and analytics related to one or more assets 100; to receive alerts from the asset tracking server 130 in respect of one or more conditions on the asset tracker 200; or to issue commands to one or more asset tracker 200 via the asset tracking server 130. The administration terminal 140 is shown as a laptop computer, however, this is not necessarily the case. An administration terminal may be a desktop computer, an industrial human-machine interface (HMI), a touch screen panel, a table, a smartphone, an Augmented Reality (AR) headset, or a Network Operations Center (NOC). The administration terminal 140 may run a web browser or a custom application which allows retrieving data and analytics, pertaining to one or more assets 100, from the asset tracking server 130 via a web interface of the asset tracking server 130. The administration terminal 140 may also be used to issue commands to one or more asset tracker 200 via the asset tracking server 130. An administrator 11 may communicate with the asset tracking server 130 using the administration terminal 140. In addition to retrieving data and analytics, the administration terminal 140 allows the administrator 11 to set alerts and geofences for keeping track of the assets 100, receiving notifications of deliveries, and so on.

In operation, an asset tracker 200 is coupled to an asset 100 to capture the asset's location, motion and/or one or more conditions pertaining to the asset. The location data is determined by a location module in communication with the satellites 170. The motion data is determined by an inertial measurement unit that is part of the asset tracker 200 or coupled thereto. The one or more conditions are determined from sensor data gathered from sensors in the asset tracker 200 or external sensors coupled to the asset tracker 200. The combination of location data, motion data, and/or sensor data comprises the asset tracking data 112. The asset tracker 200 sends the asset tracking data 112 to the asset tracking server 130 over the network 50. The asset tracking server 130 may process, aggregate, and analyze the asset tracking data 112 to generate asset information pertaining to the asset 100. The asset tracking server 130 may store the asset tracking data 112 and/or the generated asset information in the asset tracking database 132. The administration terminal 140 may connect to the asset tracking server 130, over the network 50, to access the asset tracking data 112 and/or the generated asset information. Alternatively, the asset tracking server 130 may push the asset tracking data 112 and/or the generated asset information to the administration terminal 140. An administrator 11 may use the administration terminal 140 to set alerts for certain activities pertaining to the assets 100. When criteria for an alert is met, the asset tracking server 130 sends a message to the administration terminal 140 to notify the administrator 11. For example, when an asset is moved outside of a service area the asset tracking server 130 may send an alert message to the administration terminal 140. An administrator 11 may also use the administration terminal 140 to configure an asset tracker 200 by issuing commands thereto via the asset tracking server 130. For example, the asset tracking server 130 may issue a command to the asset tracker 200 to capture certain types of sensor data in response to certain conditions.

Asset Tracker

Figure 2:
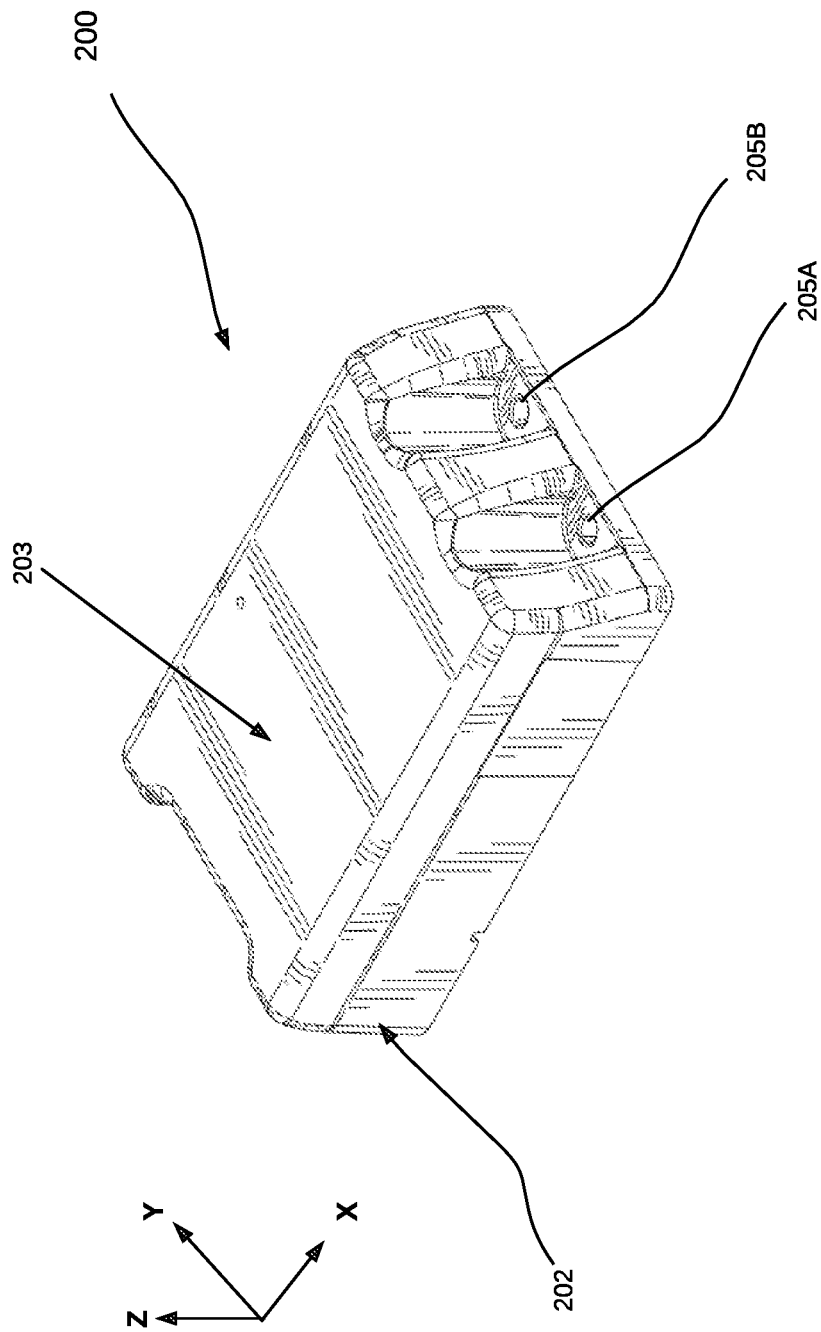
FIG. 2 is a perspective view of an exemplary battery-powered asset tracker.
Figure 3:
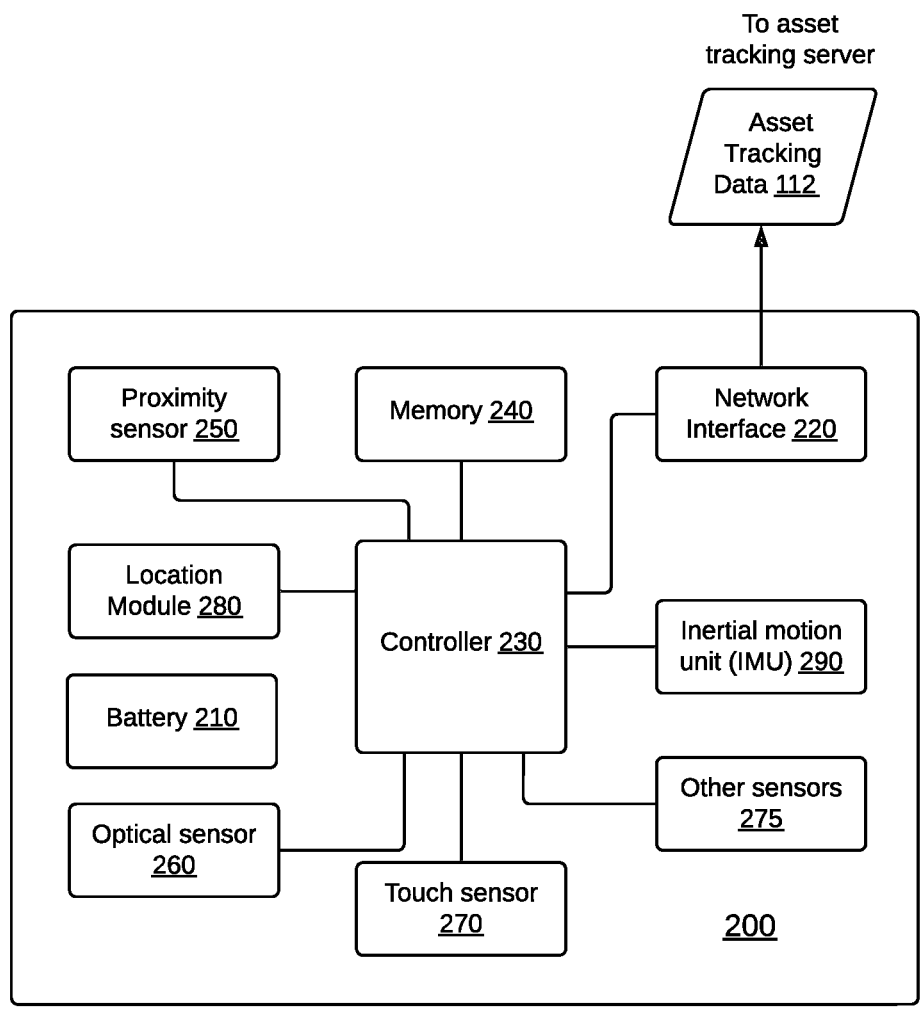
FIG. 3 is a block diagram of an exemplary battery-powered asset tracker.

Further details relating to the asset tracker 200 are shown with reference to FIG. 2 and FIG. 3. FIG. 2 is a perspective view of a battery-powered asset tracker in the form of the asset tracker 200, in accordance with embodiments of the present disclosure. The asset tracker 200 has a rugged enclosure in the form of the asset tracker housing 202 for housing the internal components of the asset tracker 200. The asset tracker housing 202 includes fastening holes 205A and 205B for fastening the battery-powered asset tracker FIG. 3 is a block diagram of an exemplary battery-powered asset tracker in the form of the asset tracker 200, in accordance with embodiments of the present disclosure. The components of the exemplary battery-powered asset tracker are disposed in the asset tracker housing 202 depicted in FIG. 2.

The asset tracker 200 includes a controller 230. A plurality of peripherals are coupled to the controller 230 by different types of interfaces. The peripherals include a memory 240, a network interface 220, an IMU 290, a proximity sensor 250, a location module 280, an optical sensor 260, a touch sensor 270, and other sensors 275. The asset tracker 200 also includes a non-rechargeable battery in the form of the battery 210. Some of the peripherals shown are optional. For example, the asset tracker 200 may not include a proximity sensor 250, an optical sensor 260, a touch sensor 270, and/or other sensors 275.

The controller 230 may include one or any combination of a processor, a microprocessor, a microcontroller (MCU), a central processing unit (CPU), a System-on-Chip (SOC), a processing core, a state machine, a logic gate array, an application-specific integrated circuit (ASIC), a field-programmable gate array (FPGA), or any other hardware component or combination of hardware components capable of executing machine-executable programming instructions. The controller 230 may follow a Von Neumann Architecture, a Harvard Architecture, or a Modified Harvard Architecture. The controller 230 may be a Complex Instruction Set Computer (CISC) processor supporting a complex instruction set that can perform multiple operations in a single instruction. Alternatively, the controller 230 may be a Reduced Instruction Set Computer (RISC) processor having a simplified and streamlined instruction set, and employs a pipeline architecture to optimize execution. The controller 230 may have a single processor core or multiple processor cores supporting parallel execution of instructions. The controller 230 may have an internal memory for storing machine-executable programming instructions to be executed by the controller 230 to carry out the steps of the methods described in this disclosure.

The memory 240 is an electronic storage component that enables storage of data and machine-executable programming instructions. The memory 240 may be a read-only-memory (ROM) including a Programmable ROM (PROM), and Erasable Programmable ROM (EPROM), Electrically Erasable Programmable ROM (EEPROM), or Flash memory. The memory 240 may be a random access memory (RAM) including Static RAM (SRAM) and Dynamic RAM (DRAM). Alternatively, the memory 240 may be a Ferroelectric RAM (FRAM), a Magnetic Random Access Memory (MRAM), or a Phase-Change Memory (PCM). The memory 240 may also be any combination of the aforementioned types. The memory 240 is for storing machine-executable programming instructions and/or data to support the functionality described in this disclosure. The memory 240 is coupled to the controller 230, via a bus, thus enabling the controller 230 to execute the machine-executable programming instructions stored in the memory 240 and/or to access the data stored therein.

The location module 280 determines the location of the asset tracker 200. The location data may be in the form of a latitude and longitude, in Universal Transverse Mercator (UTM) coordinates, or any other similar form.

In some implementations, the location module 280 is a GNSS transceiver supporting one or more of the aforementioned GNSS technologies. The location module 280 may be integrated into the controller 230 or coupled to the controller 230 by a serial interface such as the Serial Peripheral Interface (SPI), the Inter-Integrated Circuit (I2C), Universal Asynchronous Receiver Transmitter (UART), Universal Serial Bus (USB), and Secure Digital Input/Output (SDIO).

In other implementations, the location module 280 determines the location of the asset tracker 200 from a cellular network using cell tower triangulation. In this case, the location module 280 is a firmware module that computes location based on information received from the network interface 220, which in this case is a cellular modem providing signal measurements from multiple nearby cell towers. The location module 280 uses the signal measurements to estimate the location of the asset tracker 200. The location data determined by the location module 280 is sent to the controller 230.

The proximity sensor 250 is an electronic component that can detect the presence of a nearby proximity object without any physical contact. In this disclosure, the proximity sensor 250 is used to determine whether the asset tracker 200 is in a shipping box or has been removed therefrom. In this disclosure, the proximity sensor 250 is a device that measures magnetic field, and the proximity object is a magnet deployed in the shipping box of the asset tracker 200. Examples of the proximity sensor 250 include a Hall Effect sensor, microelectromechanical systems (MEMS) magnetic field sensors, Quantum sensors, and magnetic field sensors. The proximity sensor 250 may be integrated into the controller 230 or coupled thereto by a serial interface such as SPI, I2C, UART, USB, or SDIO.

The optical sensor 260 is an electronic component that can detect and/or measure light or other optical properties. Examples of optical sensors include, but are not limited to photodiodes, phototransistors, and photoresistors. Photodiodes are semiconductor devices that convert light into an electric current. Phototransistors are similar to photodiodes but have an internal gain. Photoresistors are passive components whose resistance changes with incident light intensity. The optical sensor 260 is coupled to the controller 230 and is configured to indicate to the controller 230 whether there is light incident on the optical sensor 260.

The touch sensor 270 is a touch-sensitive input device. In some implementations the touch sensor 270 is a capacitive touch sensor. Capacitive touch sensors work by making changes in capacitance in response to the sensor being touched by a human finger, for example.

The other sensors 275 may be one or more of: a temperature sensor, a pressure sensor, an optical sensor, a humidity sensor, a gas sensor, an acoustic sensor, a pH sensor, a soil moisture sensor, or any other suitable sensor indicating a condition pertaining to the asset 100 to which the asset tracker 200 is coupled. The sensors provide sensor data to the controller 230. Some controllers 230 may have some integrated sensors. In other cases, the other sensors 275 are coupled to the controller using a serial interface, such as SPI, I2C, UART, USB, or SDIO. Some asset trackers may not have any built-in sensors and may only provide location information and/or IMU information. Some asset trackers may have the capability of pairing with external sensors via a wired or a wireless interface.

The IMU 290 is an inertial measurement unit. The IMU 290 is a device used to measure and provide information about the asset tracker's motion, orientation, and acceleration. The IMU 290 may be comprised of several components working together. For example, the IMU 290 may be comprised of one or more of: an accelerometer, a gyroscope, a magnetometer, and a barometer. An accelerometer measures linear acceleration in three axes (typically X, Y, and Z). In some implementations, the IMU 290 is comprised of a 3-axis accelerometer. Such implementations are characterized by low-power consumption as accelerometers consume less power than, for example, gyroscopes. A gyroscope measures the angular velocity or rate of rotation around each of the three axes. A magnetometer measures the strength and direction of a magnetic field and thus determines the heading or orientation relative to the Earth's magnetic field. A barometer measures the atmospheric pressure and that can be used to estimate changes in altitude. Some IMUs contain a microcontroller or a processor that runs sensor fusion algorithms to combine and process the data from the various above-mentioned sensors. Some IMUs contain embedded machine learning cores (MLCs). An MLC is an in-sensor engine with a classification-based AI algorithm (decision tree) that can run different tasks while the sensors are detecting motion data. Examples of IMUs with MLCs include the iNEMO inertial modules by STMicroelectronics™. Other IMUs contain a communication interface to interface with an external microcontroller or processor. Some asset trackers may not contain an IMU unit and may report motion determined from the change in location reported by the location module 280.

The IMU 290 may have additional features such as detecting a tap, detecting an orientation change, and detecting a freefall. For example, the IMU 290 may be configured to detect a single tap or a double tap, and generate an interrupt signal to the controller 230. Additionally, the IMU 290 may be configured to detect an orientation change around any one of: the X-axis, the Y-axis, and the Z-axis. When an orientation change of a specific magnitude (e.g., 60 degrees or 90 degrees) is detected, the IMU 290 can generate an interrupt signal to the controller 230. The IMU 290 may be integrated into the controller 230 or may be a separate component that communicates with the controller 230 via a serial communications interface such as SPI, I2C, UART, USB, or SDIO. The controller 230 can configure the IMU 290 by sending configuration commands thereof. Additionally, the controller 230 can query the status of the IMU 290 generally or in response to receiving an interrupt signal therefrom. The IMU 290 can have low power modes for extending the battery life of the asset tracker. For example, low power modes are characterized by the accelerometers having a low output data rate (1 to 200 Hz) and the IMU 290 consuming current in the range of fractions of a micro-amp to a few micro amps.

In some implementations, the network interface 220 includes a cellular modem utilizing cellular technology. In one implementation, the network interface 220 uses the second-generation (2G) cellular technology which is based on the Global System for Mobiles (GSM) protocol and supports data transmission protocols such as the General Packet Radio Service (GPRS) or the Enhanced Data rates for GSM Evolution (EDGE). In another implementation, the network interface 220 uses the Third-generation (3G) cellular technology utilizing the Universal Mobile Telephone System (UMTS) supporting data transfer using the High Speed Packet Access (HSPA) protocol. In yet another implementation, the network interface 220 uses the Fourth-generation cellular technology (4G) which uses the Long Term Evolution (LTE) protocol. In another implementation, the network interface 220 uses the Fifth-generation (5G) cellular technology. In yet another implementation, the network interface 220 uses the Narrowband Internet of Things (NB-IoT) which is a low-power wide-area network (LPWAN) technology that is part of the Third Generation Partnership Project (3GPP) standard.

In some implementations, the network interface 220 comprises a Wide Area Network (WAN) modem using non-cellular WAN technologies. The network interface 220 may use non-cellular WAN technologies. One example of a non-cellular WAN technology that the network interface 220 can use is the Worldwide Interoperability For Microwave Access (WiMAX™) which is based on the IEEE 802.16 family of standards. Another example of a non-cellular WAN technology that the network interface 220 may use is Long Range Wide Area Network (LoRaWAN™) technology which is a low-power WAN protocol. Yet another example of a non-cellular WAN technology that the network interface may use is Weightless which is a family of open standard low-power WAN (LPWAN) technology that operate in the sub-GHz frequency bands.

In some implementations, the network interface 220 uses a wired network technology when the asset tracker 200 is coupled to an asset that provides wired network connectivity. Examples of wired network technologies include Ethernet, Fast Ethernet, Local Talk™, Token Ring, Fiber Distributed Data Interface (FDDI), and Asynchronous Transfer Mode (ATM).

The network interface 220 is used to transmit the asset tracking data 112 to the asset tracking server 130 over the network 50. The network interface 220 may also be used to receive instructions from the asset tracking server 130 for configuring the asset tracker 200 in a certain mode and/or requesting a particular type of the asset tracking data 112 from the asset 100. The network interface may be integrated into the controller 230 or connected thereto via a parallel interface or a serial interface such as SPI, I2C, UART, USB, or SDIO.

The battery 210 is used to power the asset tracker 200. The battery 210 is a non-rechargeable battery that may be a zinc-carbon battery or an alkaline battery. For an asset tracker that is to be deployed in the field for years, the battery 210 is typically non-replaceable. This is particularly the case for asset trackers that have ingress protection and typically have a sealed housing.

In operation, the controller 230 may receive one or more of: sensor data from the other sensors 275, location data from the location module 280, and motion or orientation data from the IMU 290. Collectively, the gathered data comprises the asset tracking data 112. The controller 230 transmits the asset tracking data 112 to the asset tracking server 130 over the network 50 via the network interface 220.

In some implementations, the asset tracker 200 receives, via the network interface 220, commands from the asset tracking server 130 over the network 50. The received commands instruct the asset tracker 200 to be configured in a particular way. For example, the received commands may configure the way, rate, or frequency by which the asset tracker 200 gathers asset tracking data 112.

Modes of Operation

An asset tracker typically has at least two modes of operation. In motion detection mode, the asset tracker uses an IMU to determine whether the asset to which the asset tracker is coupled (and hence the asset tracker itself) has sustained motion for a particular duration. In response to determining that the asset tracker has experienced sustained motion for a particular duration, the asset tracker transitions to travel mode. During travel mode, the asset tracker enables (i.e., powers up) the location module 280 to track the location of the asset. In order to conserve battery power, the asset tracker does not leave the location module powered up at all times during travel mode. Instead, the asset tracker periodically powers up the location module to obtain discrete locations of the asset. During travel mode, the asset tracker also periodically powers up the network interface and sends asset tracking data to a remote server such as an asset tracking server. In some implementations, the period at which the asset tracker reports asset tracking data is large (e.g. 24 hours) in order to have a long battery life. Since the network interface 220 (e.g., a cellular modem) consumes more power than a location module (e.g., a GNSS transceiver) the asset tracker typically powers up the network interface and reports the location less frequently. When motion stops, the asset tracker transitions back to the motion detection mode.

One problem with operating an asset tracker in motion detection mode is that any sustained motion for a particular duration is presumed, by the asset tracker, to mean that the asset tracker is traveling and that the location thereof needs to be tracked. Accordingly, whenever sustained motion is detected for a particular duration or more, the location module and/or the network interface are powered up. There are situations, however, when sustained motion may take place before the asset tracker is deployed in the field. For example, the asset tracker 200 may be in transit while being shipped to a customer. If the asset tracker is in motion detection mode, the asset tracker 200 transitions to travel mode unnecessarily. Powering up the location module 280 and/or the network interface 220 consumes battery power. Since the battery is non-rechargeable and non-replaceable the life of the asset tracker 200 is reduced as a result of the false determination of travel and the unnecessary transition to travel mode.

One solution to the aforementioned problem is to have an additional mode, known as the shipping mode, which is an ultra-low power mode. While in shipping mode, most of the peripherals of the asset tracker 200 are powered off. The asset tracker only transitions to motion detection mode in response to activation trigger activity. This is illustrated in FIG. 4.

Figure 4:
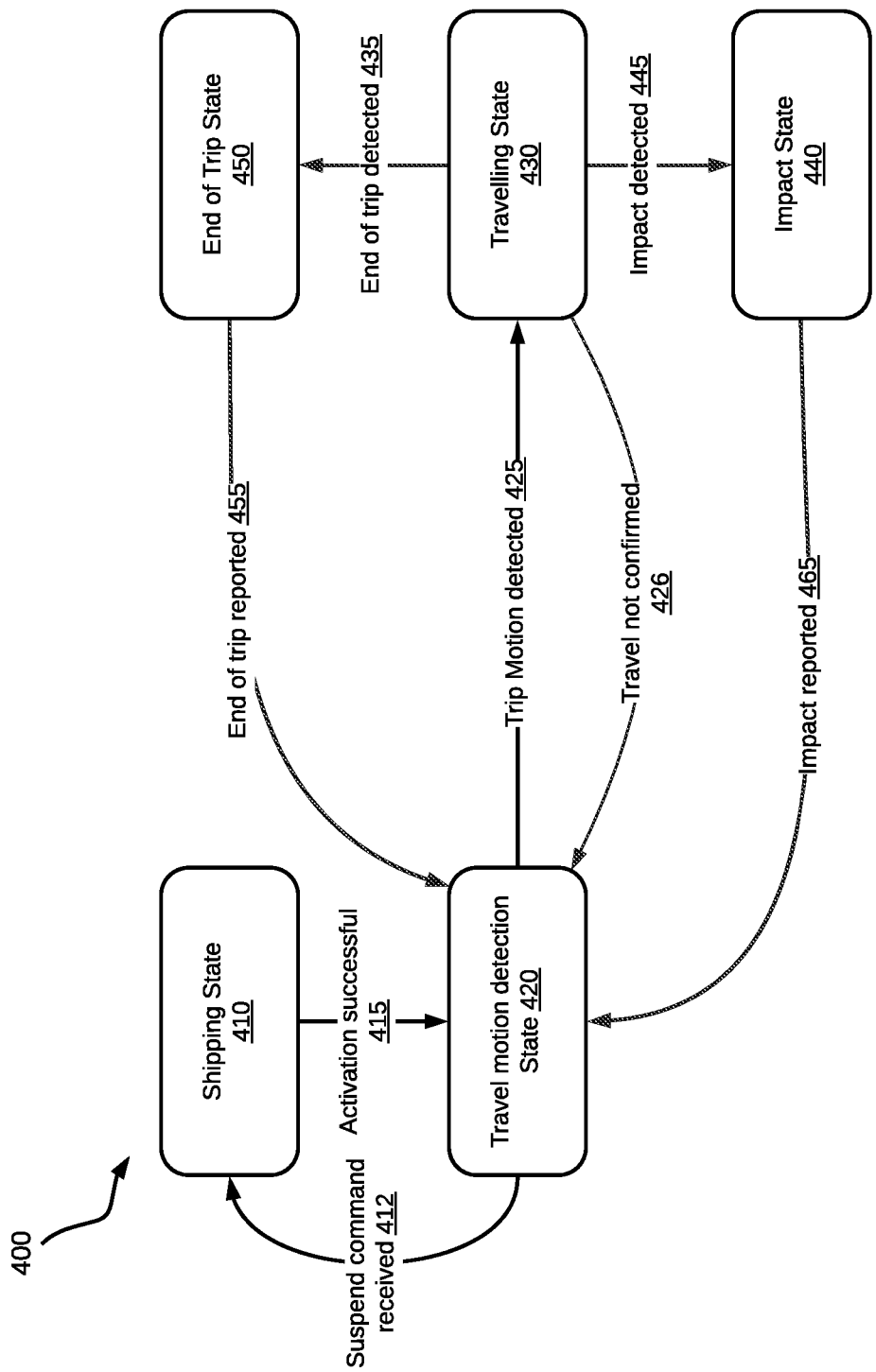
FIG. 4 is a state diagram showing the operating states of an exemplary battery-powered asset tracker, in accordance with implementations of the present disclosure.
Figure 5:
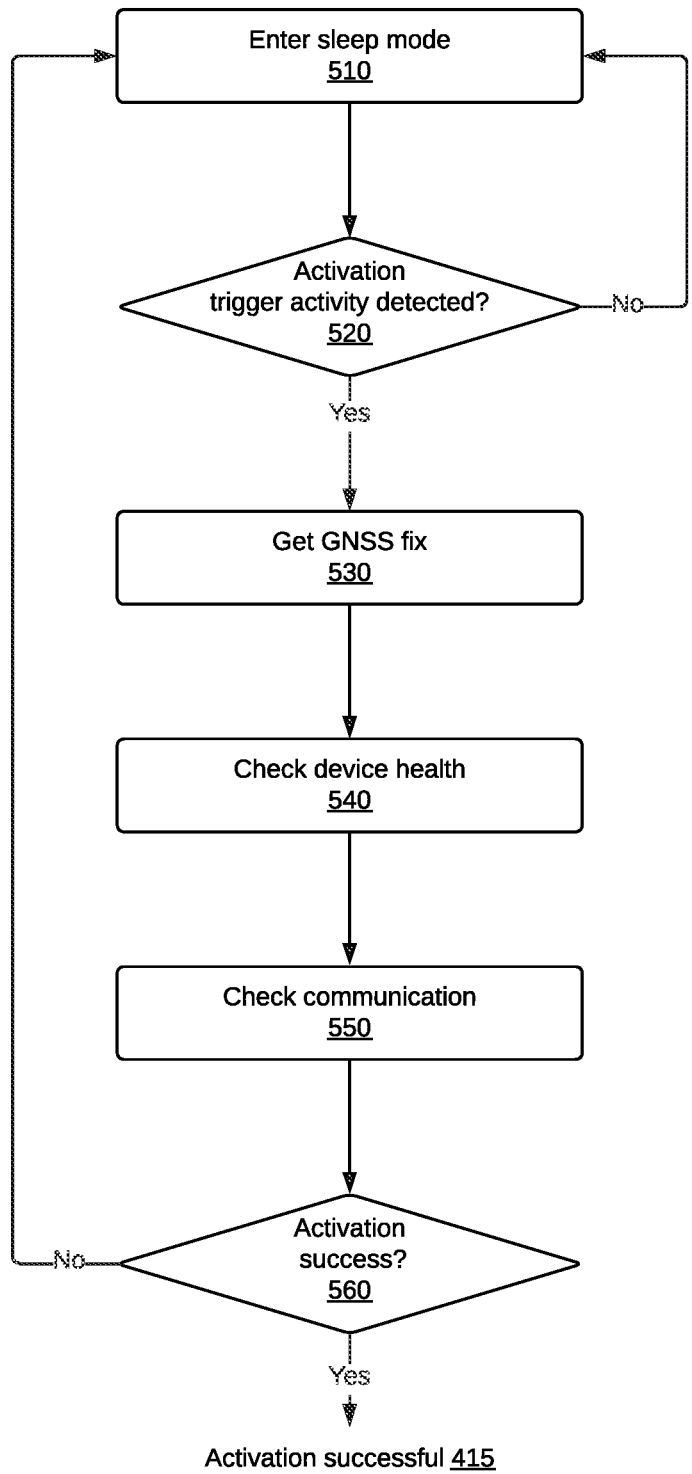
FIG. 5 is a flowchart depicting the steps performed by an exemplary asset tracker while in the shipping state, in accordance with embodiments of the present disclosure.

FIG. 4 is a state diagram 400 depicting the different states of operations of an asset tracker 200, in accordance with embodiments of the present disclosure. When the asset tracker 200 is off production and ready to ship to a customer, the asset tracker 200 is in shipping state 410. In shipping state 410, the asset tracker 200 starts out in a sleep mode. FIG. 5 depicts the various actions that take place in the asset tracker 200 while the asset tracker 200 is in the shipping state 410. First, at step 510, the asset tracker 200 enters sleep mode. In sleep mode the asset tracker has most of the peripherals thereof powered down except for one or more peripherals necessary for detecting an activation trigger activity. Examples of peripherals necessary for detecting an activation trigger activity include the IMU 290, the proximity sensor 250, the optical sensor 260, and the touch sensor 270.

At step 520, the asset tracker 200 checks whether it can detect an activation trigger activity. The activation trigger activity depends on the implementation of the asset tracker 200.

In some implementations, the activation trigger activity involves tapping on the asset tracker 200 such as tapping on the top housing surface 203 of the asset tracker housing 202. In such implementations, most peripherals are powered down, except the IMU 290 which is configured to detect a tap of a particular magnitude in the direction substantially perpendicular to a surface of the asset tracker housing 202 such as the top housing surface 203. Similarly, in some implementations the activation trigger activity comprises at least one mid-air gesture performed by the asset tracker 200. In both of the aforementioned implementations, in step 510 (sleep mode) most peripherals are powered down except for the IMU 290. In this implementation, the asset tracker 200 configures the IMU 290 to detect at least one mid-air gesture.

In some implementations, the activation trigger activity comprises sensing a touch on a surface of the asset tracker housing 202. For example, the activation trigger activity may comprise sensing a touch on the top housing surface 203 for a sustained duration. In this implementation, in step 510 (sleep mode), most peripherals are powered off except for the touch sensor 270.

In some implementations, the activation trigger activity comprises exposing an optical sensor to incident light. For example, the optical sensor 260 may be covered by a sticker that prevents ambient light from being incident on the optical sensor 260. The asset tracker 200 may then be activated by removing the sticker which exposes the optical sensor 260. In this implementation, step 510 (entering sleep mode) comprises powering off most peripherals except for the optical sensor.

In some implementations, the activation trigger activity comprises detecting a loss of proximity between a proximity sensor of the asset tracker and a proximity object in a packaging of the asset tracker 200. For example, the asset tracker may contain a proximity sensor 250 such as a Hall effect sensor or a Reed switch. The packaging (e.g., the shipping box) of the asset tracker contains a proximity object. When the asset tracker is placed in the packaging, the proximity object is in proximity to the proximity sensor 250. In some implementations, the proximity sensor comprises a Hall Effect sensor and the proximity object comprises a magnet. In other implementations, the proximity sensor comprises a reed switch and the proximity object comprises a magnet. In such implementations, step 510 (entering sleep mode) involves powering most peripherals off except for the proximity sensor.

In the various aforementioned implementations, the peripheral that detects the activation activity is configured to notify the controller 230 of the activation trigger activity. For example, the IMU 290 may be configured to generate an interrupt signal when either an activation orientation change is detected or a tapping is detected. Similarly, the optical sensor 260 may be configured to generate an interrupt signal to notify the controller 230 that incident light was detected thereon. The touch sensor 270 may also be configured to generate an interrupt signal to notify the controller 230 of detecting a touch. In implementations using a proximity sensor such as a reed switch or a Hall effect sensor, the sensor is configured to generate an interrupt signal to notify the controller 230 of the state change of the proximity sensor.

When an interrupt signal is generated and detected by the controller 230, this constitutes detecting an activation trigger activity. Control goes from step 520 to step 530. If an activation trigger activity is not detected, control goes back to step 510.

At step 530, the asset tracker 200 powers up the location module 280. In some implementations, the location module is a GNSS receiver and powering up the location module 280 includes powering up the GNSS receiver and obtaining a GNSS fix (i.e., location).

At step 540, the asset tracker 200 checks the health of the various components of the asset tracker 200. For example, the asset tracker 200 may execute firmware instructions (i.e., machine-executable programming instructions) that verify that the various peripherals of the asset tracker 200 are functioning correctly. For example, the firmware instructions may write values to various registers of the peripherals and then read such values back. The firmware instructions may also read values from the sensors and compare such values with expected values.

At step 550, the asset tracker 200 powers up the network interface 220 and verifies that the asset tracker 200 can send and receive data. For example, the asset tracker 200 verifies that the asset tracking server 130 is reachable.

At step 560, the asset tracker 200 checks whether steps 530, 540, and 550 have been successful. Specifically, at step 560, the asset tracker 200 checks whether the GNSS fix was obtained, the device health check has indicated that the peripherals are working correctly, and the network interface 220 is working properly. If the aforementioned conditions are satisfied, then the activation is successful. An activation successful event 415 causes the asset tracker to transition to the travel motion detection state 420. If the aforementioned conditions are not satisfied, then the activation was not successful and control goes back to step 510. In the latter case, the asset tracker 200 remains in the shipping state 410.

Figure 6:
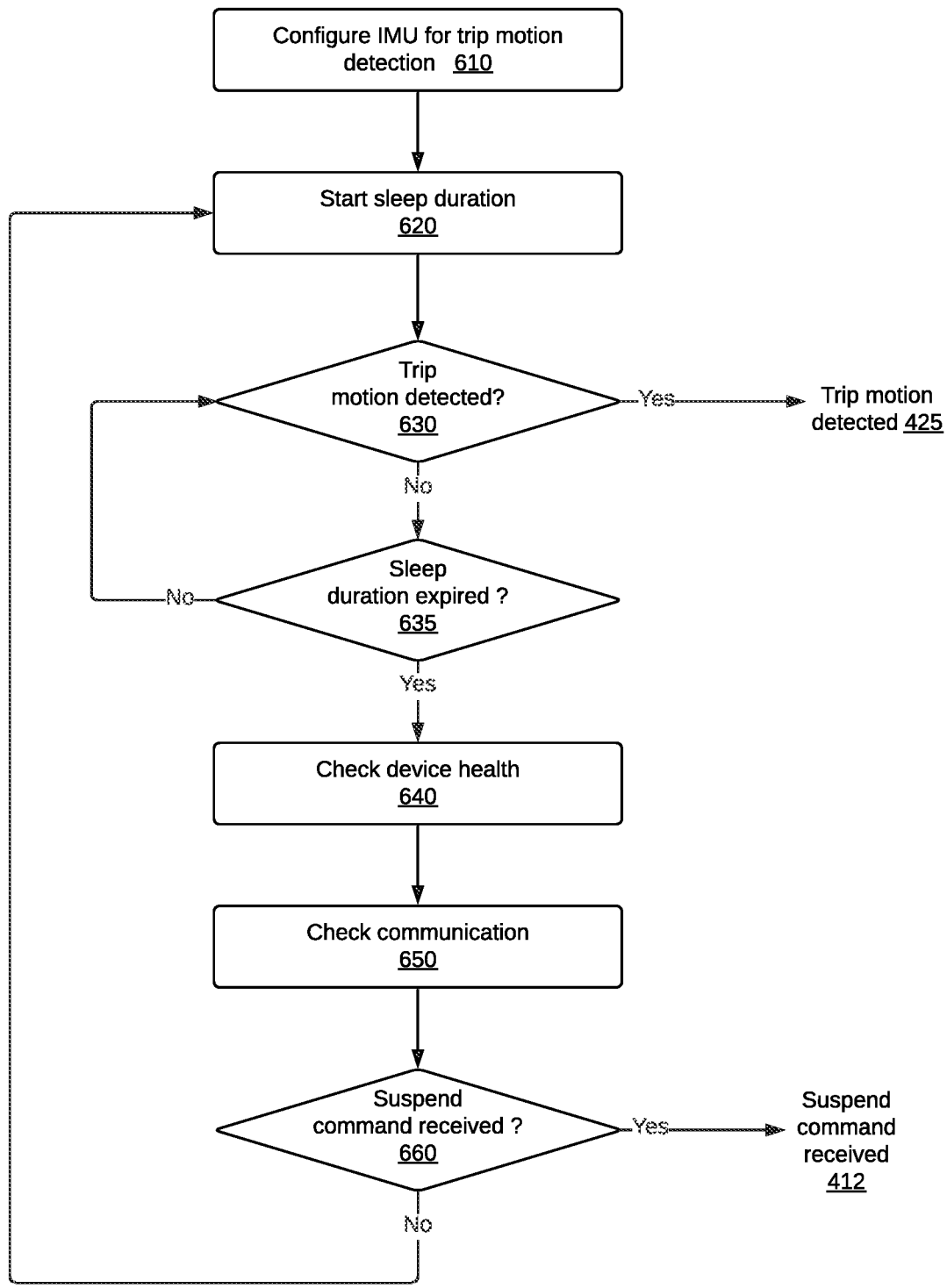
FIG. 6 is a flowchart depicting the steps performed by an exemplary asset tracker while in the travel motion detection state, in accordance with embodiments of the present disclosure.

Upon entering the travel motion detection state 420, the asset tracker 200 performs some actions depicted in FIG. 6.

At step 610, the asset tracker 200 configures the IMU 290 for trip motion detection. As discussed, in some implementations the IMU 290 is a 3-axis accelerometer. Configuring the IMU 290 for trip motion detection comprises configuring the 3-axis accelerometer for detecting an acceleration value that is above a travel motion acceleration threshold for duration exceeding a travel motion detection duration threshold. For example, the IMU 290 may be configured to check for sustained acceleration exceeding a travel motion acceleration threshold exceeding 0.1 g or 0.3 g for a duration exceeding a travel motion detection duration threshold of 2 minutes. In the travel motion detection mode state, the asset tracker 200 configures the IMU 290 to sample the built-in accelerometers thereof at a low sampling rate, such as 1 Hz to 10 Hz. This is because in the travel motion detection state 420 the asset tracker 200 is checking for sustained acceleration indicative of travel. Additionally, in some implementations, the IMU 290 is configured for noise filtering to filter out high frequency acceleration that could be indicative of vibration. For example, the asset tracker 200 may be deployed in a concrete mixer, a generator, or any other equipment that undergoes a certain level of vibration during operation even as the equipment is not in motion. To filter the noise, acceleration data is passed through a low-pass filter integral to the IMU 290. Noise filtering serves to eliminate or at least reduce false positives that may be detected by the IMU 290 during operation While the asset tracker 200 is in the travel motion detection state 420, the asset tracker 200 is in sleep mode with only the IMU 290 powered up and configured for trip motion detection as discussed above. In some implementations periodically checks the health of the device and the communication health of the network interface 220. To do this periodically, at step 620 the asset tracker 200 configures a timer with a sleep duration. The timer may be a hardware timer that is part of the controller 230, a separate hardware timer, or a software timer. The asset tracker 200 configures the timer with the sleep duration, which may be for example equal to 72 hours. This means that every 72 hours, the timer will expire and generate an event notification with the controller 230.

At step 630, the asset tracker 200 checks whether a trip motion has been detected. The check for trip motion comprises checking whether the acceleration measured by the 3-axis accelerometer of the IMU 290 has exceeded a travel motion acceleration threshold for a duration exceeding a travel motion detection duration threshold. The IMU 290 may be configured to generate an event, such as an interrupt, with the controller 230 when the acceleration has exceeded the travel motion acceleration threshold for a duration exceeding the travel motion detection duration threshold. When trip motion is detected, a trip motion detected 425 transitions the asset tracker 200 to the traveling state 430. When trip motion is not detected, control goes to step 635.

At step 635, the asset tracker 200 checks whether the sleep duration has expired and that it is time to check the device health and the communication health of the network interface 220. If the sleep duration has not expired, control goes back to step 635. If the sleep duration has expired, control goes to step 640.

Step 640 is identical to step 540 discussed above. Similarly, step 650 is similar to step 550 discussed above. After both step 640 and step 650 are carried out, control goes to step 660.

At step 660, the asset tracker 200 checks whether a suspend command has been received from the asset tracking server 130. If a suspend command has been received, the asset tracker 200 transitions back to the shipping state via the transition 412 of FIG. 4. If a suspend command has not been received, control goes back to step 620 to restart another sleep duration.

In step 630, if trip motion has been detected, the asset tracker 200 transitions to the traveling state 430. In the traveling state 430, the asset tracker 200 executes a method comprised of a plurality of steps. In some implementations, the asset tracker 200 performs end-of-trip detection using the IMU 290. In other implementations, the asset tracker 200 performs end-of-trip detection using the GNSS module and uses the IMU 290 for impact detection. In other implementations, the IMU 290 is used for both end-of-trip detection and impact detection.

Figure 7A:
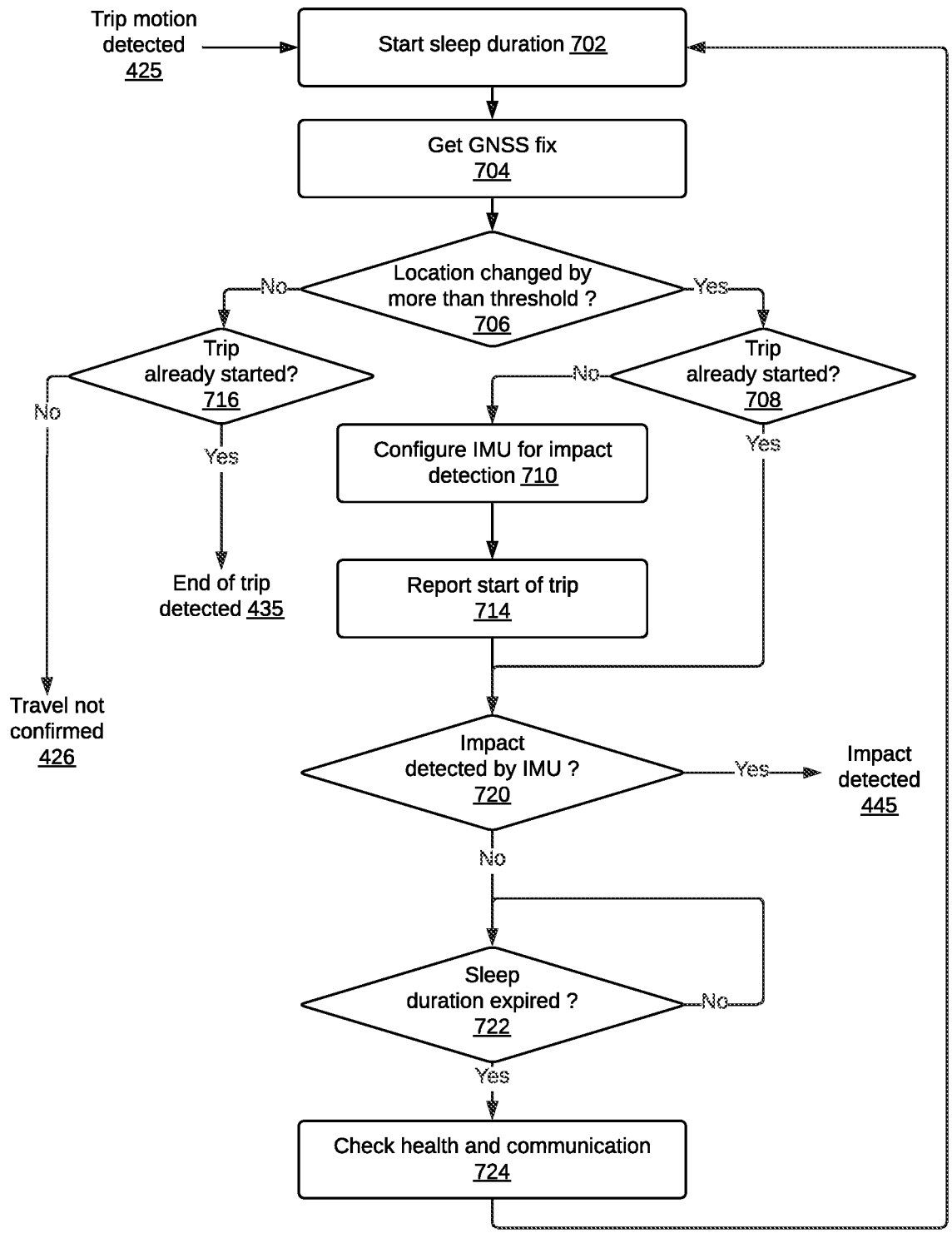
FIG. 7A is a flowchart depicting the steps performed by an exemplary asset tracker while in the traveling state, in accordance with an embodiment of the present disclosure.

Turning first to FIG. 7A, which depicts the method steps performed by the asset tracker 200 when the asset tracker 200 is in the traveling state 430, in accordance with some implementations of the present disclosure. In the implementation of FIG. 7A, the location module 280, which in some implementations is a GNSS transceiver, is used to detect the start and end of trip, while the IMU 290, which in some implementations is a 3-axis accelerometer, is configured for impact detection.

At step 702, the asset tracker 200 starts the sleep duration, for example by programming a timer. The traveling state sleep duration is different from the sleep duration used in the trip detection state. As an example, the traveling state sleep duration is shorter, such as 1 hour.

At step 704, the asset tracker 200 obtains a GNSS fix and determines the current location thereof.

At step 706, the asset tracker 200 determines whether the asset tracker 200 has traveled a distance greater than a traveling distance threshold. Specifically, if the asset tracker 200 determines whether the current location thereof differs from the location determined in step 530 of FIG. 5 by a distance which is greater than a traveling distance threshold. By way of example, the traveling distance threshold may be 200 m. In this case if the asset to which the asset tracker 200 is coupled has moved only a distance of 50 m since the previous GNSS fix of step 530, then the asset tracker 200 does not consider that the asset tracker 200 is in motion. For example, the asset tracker 200 may be coupled to a concrete mixer or a generator and is simply being moved around within a construction site. When the location of the asset tracker 200 has moved by a distance which is greater than the traveling distance threshold, control goes to step 708. When the location of the asset tracker 200 has moved by a distance which is smaller than the traveling distance threshold, control goes to step 716.

At step 708, the asset tracker 200 checks whether a start of trip has already been detected. This check is because the steps 702 through 724 are repeated in a loop (as indicated by the arrow from step 724 back to step 702 as discussed below). The asset tracker 200 behaves differently based on whether there is an active trip that has already started. In the first iteration of the loop, no trip has already started yet and the change in location detected at step 706 serves as a trigger to start a trip. So, in the first iteration of the loop, the test at step 708 is false and control goes to step 710. In subsequent iterations of the loop the test at step 708 is true and control goes to step 720 (as steps 710 and 714 will have been performed in a prior iteration).

At step 710, the asset tracker 200 configures the IMU 290 for impact detection. Specifically, the asset tracker 200 configures a 3-axis accelerometer for detecting an acceleration value that is higher than an impact acceleration threshold. For example, an impact acceleration threshold may be between 1.5 g and 3 g. Configuring the IMU 290 for impact detection is for detecting any accidents during the trip which has just started as a result of the location change detected in step 706.

At step 714, the asset tracker 200 reports the start of the trip. For example, the asset tracker 200 may power up the network interface 220 and send a notification to the asset tracking server 130 indicating that the asset tracker 200 has initiated a trip and is now in traveling state.

At step 720, the asset tracker 200 determines whether an impact has been detected. In some implementations, the IMU 290 generates an interrupt event detectable by the controller 230, the interrupt event indicating that an impact which is above the impact acceleration threshold has been detected by the IMU 290 (or the 3-axis accelerometer thereof). If an impact has been detected, the asset tracker transitions due to the impact detected event 445, to the impact state 440. If an impact has not been detected, control goes to step 722.

At step 722, the asset tracker 200 determines whether the sleep duration set in step 704 has expired. In some implementations, step 722 is a timer expiration event. If the sleep duration timer expires, then control goes to step 724 and the method continues there. If the sleep duration timer has not expired, the asset tracker 200 enters sleep mode and remains in sleep mode until the sleep duration timer has expired.

At step 724, the sleep duration has expired and the asset tracker 200 wakes up from sleep mode. At step 724, the asset tracker checks the health of its peripherals and the health of the network interface 220. Step 724 is identical to steps 540 and 550 of FIG. 5 and to steps 640 and 650 of FIG. 6. Subsequent to step 724, control goes back to step 702.

At step 716, if a trip had already started and the location of the asset tracker has not changed since the previous GNSS fix, then that signals that the asset tracker 200 was on a trip and has stopped moving. In this implementation, the asset tracker 200 determines that an end of trip event 435 has taken place. If the location has not changed since the previous GNSS fix and a trip has not started, then travel is not confirmed. In the latter case, a travel not confirmed event 426 is generated which takes the asset tracker back to the travel motion detection state 420.

In some implementations, the reporting of the start of the trip and/or the reporting of the end of the trip are only done when the sleep duration expires. For example, the asset tracker 200 records the time and location of the start of the trip and only reports it to the asset tracking server after the expiration of the sleep duration in step 722. In such implementation, reporting the start of the trip is done while checking for the health and communication in step 724.

Similarly, in some implementations, reporting the end of the trip is also done while checking for the health and communication in step 724.

In the aforementioned implementation described in FIG. 7A, the IMU 290 is configured for impact detection whereas the end of trip detection is carried out solely by the location module 280, which can be a GNSS transceiver. Advantageously, both end of trip detection and impact detection are feasible. However, since a GNSS fix (step 704) only takes place every sleep duration, reporting the start of trip and reporting the end of trip will sometimes be delayed. Another implementation, shown in FIG. 7B, forgoes the detection of impacts and uses the IMU 290 for end of trip detection. One advantage of the use of the IMU 290 for end of trip detection is that the IMU 290 (particularly if it is only comprised of a 3-axis accelerometer) consumes much less power and can generate an interrupt event when a condition is satisfied. A GNSS transceiver consumes more power and therefore cannot be powered on all the time.

Figure 7B:
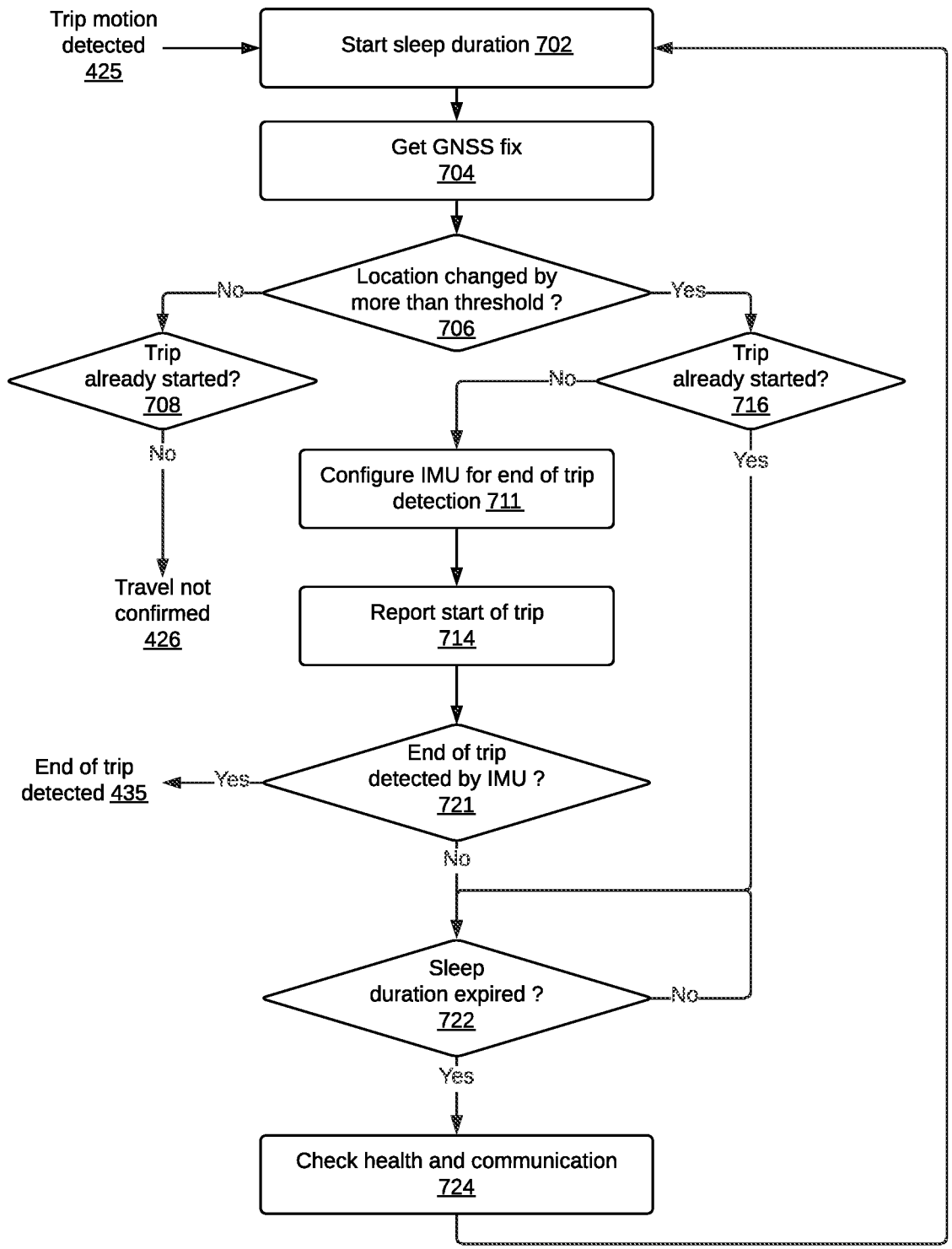
FIG. 7B is a flowchart depicting the steps performed by an exemplary asset tracker while in the traveling state, in accordance with another embodiment of the present disclosure.

The steps of the method of FIG. 7B are substantially similar to the steps of the method of FIG. 7A, with some notable differences as described below.

Steps 702 and 704 are unchanged from the corresponding steps described above with reference to FIG. 7A.

At step 706, if the location has changed by more than a travel distance threshold, control goes to step 716 as before. If the location has not changed by more than the travel distance threshold, control goes to step 708.

At step 708, if a start of trip has not been detected (and the location has not changed by more than the threshold from step 706), then travel is not confirmed. A travel not confirmed event 426 is generated, which takes the asset tracker back to the travel motion detection state 420.

At step 716, if the start of the trip had already been detected, control goes to step 722. If the start of the trip had not been detected, control goes to step 711.

At step 711, the asset tracker 200 configures the IMU 290 for end of trip detection. Configuring the IMU 290 for end of trip detection comprises configuring a 3-axis accelerometer to generate an event if the detected acceleration drops by an end of trip acceleration drop threshold for a sustained duration. For example, the 3-axis accelerometer may detect acceleration in the x-direction, the y-direction, and the z-direction. The 3-axis accelerometer may be configured to generate an end of trip interrupt event to the controller 230 when the resultant acceleration for the x-direction, the y-direction, and the z-direction drops to a lower acceleration value by the end of trip acceleration drop threshold and remains at the lower acceleration value for at least an end of trip detection duration.

At step 714, the start of the trip is reported as described above.

At step 721, if the end of trip is detected, an end of trip detected event 435 transitions the asset tracker 200 to the end of trip state 450. If an end of trip is not detected, control goes to step 722.

Steps 722 and 724 have been described above with reference to FIG. 7A.

Advantageously, the method of FIG. 7B captures an end of trip event as soon as detected by the IMU 290 thus reporting the end of trip is in real-time as opposed to at the expiry of the sleep duration and/or when a new GNSS fix is obtained.

In yet another implementation, the asset tracker 200 utilizes the IMU 290 for detecting both an end of trip event and an input event. This is described with reference to FIG. 7C.

Figure 7C:
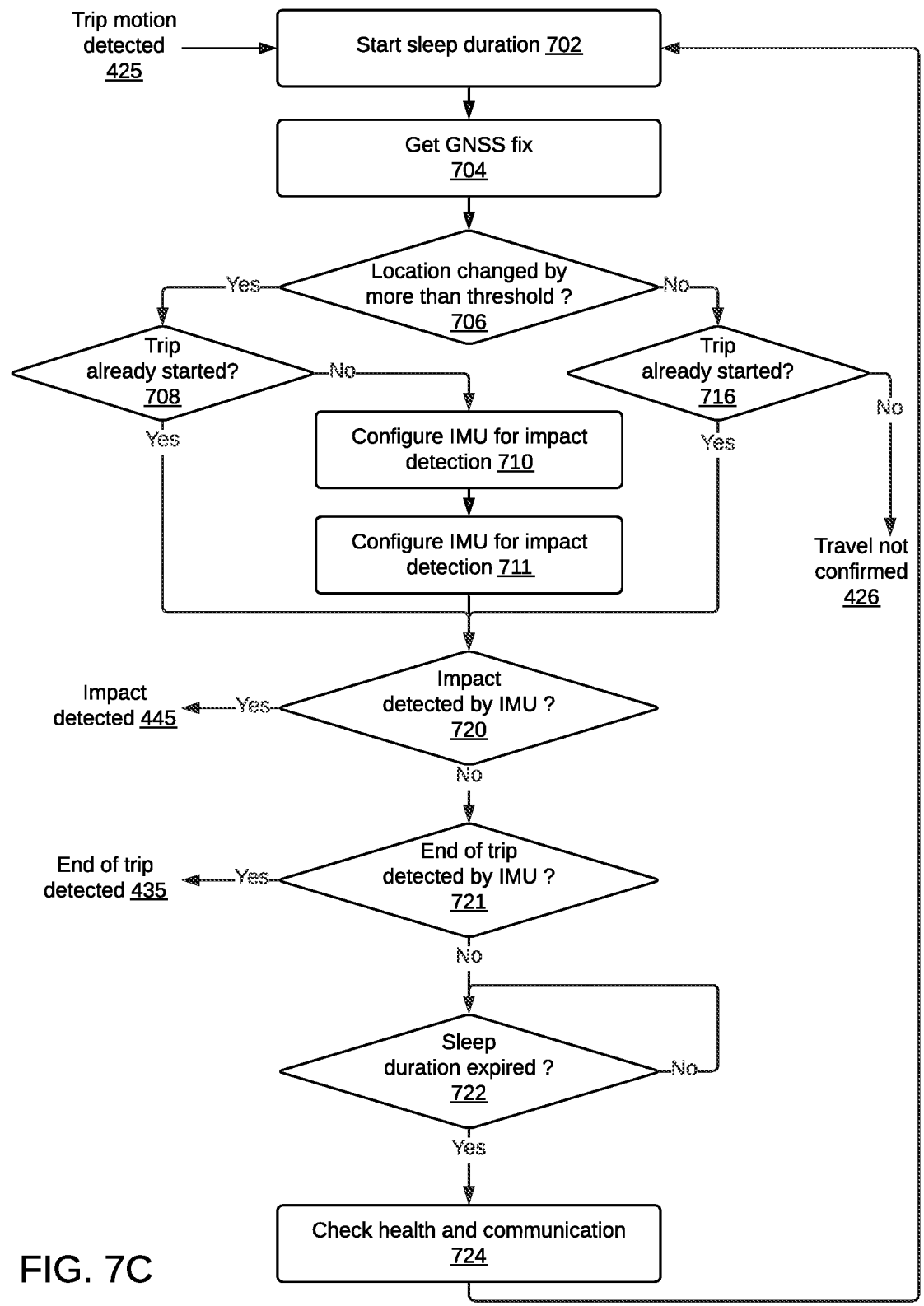
FIG. 7C is a flowchart depicting the steps performed by an exemplary asset tracker while in the traveling state, in accordance with yet another embodiment of the present disclosure.

Steps 702 and 704 in FIG. 7C are identical to the corresponding steps in FIG. 7B.

At step 706, if the location has changed by more than the travel distance threshold, then control goes to step 708. If the location has not changed by more than the travel distance threshold, then control goes to step 716.

At step 716, if a trip has already started, control goes to step 720. If a trip has not already been started, then travel is not confirmed. As such, a travel not confirmed event 426 is generated, and the asset tracker 200 transitions back to the travel motion detection state 420.

At step 708, if a trip has not already started, control goes to step 710. If a trip has already started, control goes to step 720.

Step 710 and step 711 are identical to the step 710 of FIG. 7A and step 711 of FIG. 7B, respectively. As such, the IMU 290 can generate an interrupt event if the 3-axis accelerometer detects an acceleration above an impact acceleration threshold. Additionally, the IMU 290 can generate an interrupt even if the 3-axis accelerometer detects a drop in acceleration value that is greater than an end of trip acceleration drop threshold for an end of trip threshold duration or longer.

Step 720 is identical to step 720 of FIG. 7A. If an impact is detected an impact detected event 445 causes the asset tracker 200 to transition to the impact state 440.

Step 721 is identical to step 721 of FIG. 7B. If an end of trip is detected, an end of trip detected event 435 is generated and the asset tracker 200 transitions to the end of trip state 450.

Steps 722 and 724 are identical to the corresponding steps above.

The method of FIG. 7C can be implemented by an asset tracker that has an IMU 290 which can support detecting both an impact and a drop in acceleration value(s) sustained for a specified duration. Some IMUs/3-axis accelerometers support this feature. Advantageously, an asset tracker implementing the method of FIG. 7C in its traveling state can report timely end of trip events and timely collision events.

Figure 8:
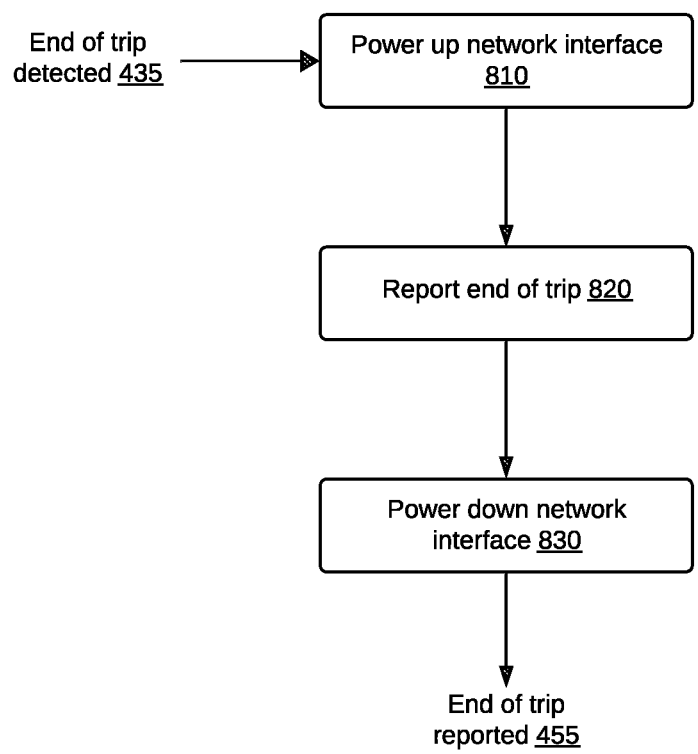
FIG. 8 is a flowchart depicting the steps performed by an exemplary asset tracker while in the end of trip state, in accordance with embodiments of the present disclosure.

FIG. 8 depicts the steps carried out by the asset tracker 200 when at the end of trip state 450. At step 810 the asset tracker powers up the network interface 220. At step 820, the asset tracker 200 reports the end of trip event by sending, over the network interface 220, an indication of the end of trip to a remote entity such as the asset tracking server. At step 830, the asset tracker 200 powers down the network interface 220 to save power. After powering down the network interface, an end of trip reported event 455 causes the asset tracker 200 to transition back to the travel motion detection state 420.

Figure 9:
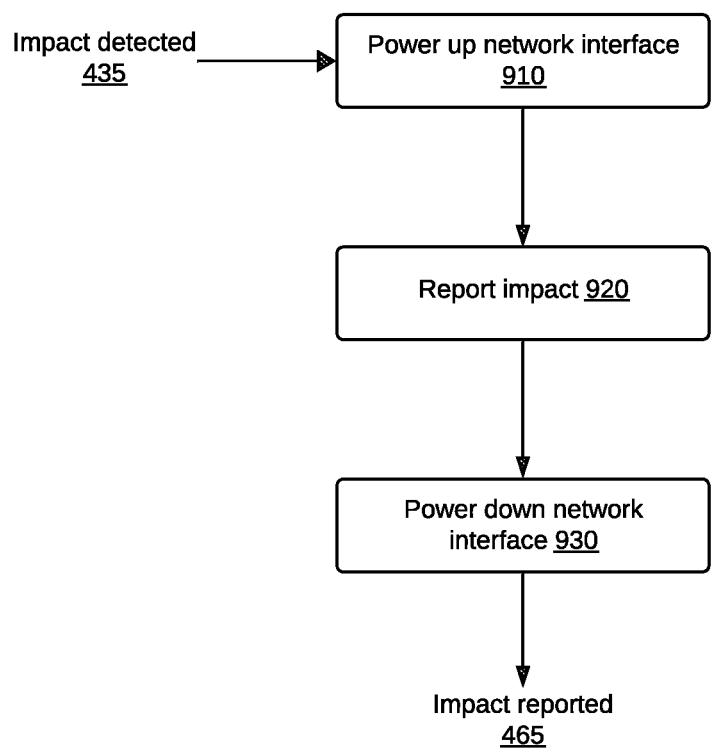
FIG. 9 is a flowchart depicting the steps performed by an exemplary asset tracker while in the impact state, in accordance with embodiments of the present disclosure.

FIG. 9 depicts the steps carried out by the asset tracker 200 when in the impact state 440. At step 910 the asset tracker powers up the network interface 220. At step 920, the asset tracker 200 reports the impact event by sending, over the network interface 220, an indication of the detected impact (e.g., the magnitude and a timestamp thereof) to a remote entity such as the asset tracking server. At step 930, the asset tracker 200 powers down the network interface 220 to save power. After powering down the network interface an impact reported event 465 causes the asset tracker 200 to transition back to the travel motion detection state 420.

Embodiments have been described where the techniques are implemented in circuitry and/or computer-executable instructions. It should be appreciated that some embodiments may be in the form of a method or process, of which at least one example has been provided. The acts performed as part of the method or process may be ordered in any suitable way. Accordingly, embodiments may be constructed in which acts are performed in an order different than illustrated, which may include performing some acts simultaneously, even though shown as sequential acts in illustrative embodiments. Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention claimed is:

1. A method for trip detection by an asset tracker, the method comprising:
   operating the asset tracker in a shipping state;
   in response to an activation successful event, transitioning the asset tracker to a travel motion detection state; and
   in response to detecting travel motion, transitioning the asset tracker to a traveling state;
   in the traveling state:
      obtaining a second location of the asset tracker; and
      when a distance between the second location and the first location is greater than a travel distance threshold:
         when a trip has not already started:
            configuring a 3-axis accelerometer for impact detection, and reporting a start of trip event;
   wherein operating the asset tracker in the shipping state comprises:
      entering a sleep mode;
      configuring an inertial measurement unit to detect an activation trigger activity; and
      in response to detecting the activation trigger activity:
         obtaining a first location of the asset tracker; and
         generating the activation successful event.

2. The method of claim 1, further comprising, in the traveling state:
   in response to detecting an impact by the 3-axis accelerometer:
   transitioning to an impact state.

3. A method for trip detection by an asset tracker, the method comprising:
   operating the asset tracker in a shipping state;
   in response to an activation successful event, transitioning the asset tracker to a travel motion detection state; and
   in response to detecting travel motion, transitioning the asset tracker to a traveling state;
   in the traveling state:
      obtaining a second location of the asset tracker; and
      when a distance between the second location and the first location is greater than a travel distance threshold:
         when a trip has not already started:
            configuring a 3-axis accelerometer for end of trip detection, and
            reporting a start of trip event;
   wherein operating the asset tracker in the shipping state comprises:
      entering a sleep mode;
      configuring an inertial measurement unit to detect an activation trigger activity; and
      in response to detecting the activation trigger activity:
         obtaining a first location of the asset tracker; and
         generating the activation successful event.

4. The method of claim 3, wherein configuring the 3-axis accelerometer for end of trip detection comprising configuring the 3-axis accelerometer to generate an event if a detected acceleration drops by an end of trip drop threshold for a and end of trip detection duration.

5. A method for trip detection by an asset tracker, the method comprising:
   operating the asset tracker in a shipping state;
   in response to an activation successful event, transitioning the asset tracker to a travel motion detection state; and
   in response to detecting travel motion, transitioning the asset tracker to a traveling state;
   in the traveling state:
      obtaining a second location of the asset tracker; and
      when a distance between the second location and the first location is greater than a travel distance threshold:
         when a trip has already started:
            transitioning to an end of trip state;
            reporting an end of trip event; and
            transitioning to the travel motion detection state subsequent to reporting the end of trip;
   wherein operating the asset tracker in the shipping state comprises:
      entering a sleep mode;
      configuring an inertial measurement unit to detect an activation trigger activity; and
      in response to detecting the activation trigger activity:
         obtaining a first location of the asset tracker; and
         generating the activation successful event.

6. A method for trip detection by an asset tracker, the method comprising:
   operating the asset tracker in a shipping state;
   in response to an activation successful event, transitioning the asset tracker to a travel motion detection state; and
   in response to detecting travel motion, transitioning the asset tracker to a traveling state;
   in the traveling state:
      obtaining a second location of the asset tracker; and
      when a distance between the second location and the first location is smaller than a travel distance threshold:
         when a trip has not already started:
            transitioning back to the travel motion detection state;
   wherein operating the asset tracker in the shipping state comprises:
      entering a sleep mode;
      configuring an inertial measurement unit to detect an activation trigger activity; and
      in response to detecting the activation trigger activity:
         obtaining a first location of the asset tracker; and
         generating the activation successful event.

7. A method for trip detection by an asset tracker, the method comprising:
   operating the asset tracker in a shipping state;
   in response to an activation successful event, transitioning the asset tracker to a travel motion detection state; and
   in response to detecting travel motion, transitioning the asset tracker to a traveling state;
   in the traveling state:
      obtaining a second location of the asset tracker; and
      when a distance between the second location and the first location is greater than a travel distance threshold:
         when a trip has not already started:
            configuring a 3-axis accelerometer for impact detection,
            configuring the 3-axis accelerometer for end of trip detection, and
      reporting a start of trip event wherein operating the asset tracker in the shipping state comprises:
   entering a sleep mode;
   configuring an inertial measurement unit to detect an activation trigger activity; and
   in response to detecting the activation trigger activity:
      obtaining a first location of the asset tracker, and generating the activation successful event.

* * * * *